(12) United States Patent
Chang

(10) Patent No.: US 7,065,890 B1
(45) Date of Patent: Jun. 27, 2006

(54) ADJUSTABLE SUPPORT DEVICE FOR LEVEL FACILITY

(76) Inventor: Shu Chen Chang, P.O. Box 63-298, Taichung 40699 (TW)

( * ) Notice: Subject to any disclaimer, the term of this patent is extended or adjusted under 35 U.S.C. 154(b) by 0 days.

(21) Appl. No.: 11/045,668

(22) Filed: Jan. 31, 2005

(51) Int. Cl.
*G01C 15/00* (2006.01)

(52) U.S. Cl. ....................... 33/286; 33/227; 33/DIG. 21

(58) Field of Classification Search .......... 33/281–283, 33/285–286, 290–291, 227, DIG. 21
See application file for complete search history.

(56) References Cited

U.S. PATENT DOCUMENTS

| | | | | |
|---|---|---|---|---|
| 3,331,650 A * | 7/1967 | Williams | ..................... | 356/247 |
| 3,909,952 A * | 10/1975 | Lagasse | ....................... | 33/227 |
| 5,367,779 A * | 11/1994 | Lee | .............................. | 33/290 |
| 5,594,993 A | 1/1997 | Tager et al. | .................. | 33/227 |
| 5,842,282 A | 12/1998 | Ting | .............................. | 33/227 |
| 6,202,312 B1 | 3/2001 | Rando | .......................... | 33/227 |
| 6,332,276 B1 * | 12/2001 | Mangel | ........................ | 33/286 |
| 6,427,347 B1 * | 8/2002 | Butler, Sr. | .................... | 33/286 |
| 6,493,955 B1 | 12/2002 | Moretti | ........................ | 33/451 |
| 6,922,901 B1 * | 8/2005 | Chou et al. | ................... | 33/290 |
| 6,931,739 B1 * | 8/2005 | Chang et al. | ................. | 33/286 |
| 6,941,665 B1 * | 9/2005 | Budrow et al. | ............... | 33/286 |
| 2003/0051355 A1 * | 3/2003 | Phuly et al. | .................. | 33/286 |
| 2004/0255477 A1 * | 12/2004 | Levine et al. | ................. | 33/286 |

\* cited by examiner

*Primary Examiner*—Yaritza Guadalupe
(74) *Attorney, Agent, or Firm*—Charles E. Baxley

(57) ABSTRACT

An adjustable support device includes a housing secured on a base, a platform pivotally secured to the housing for supporting a level facility. A threaded member is rotatably supported on the base, a motor is coupled to the threaded member to rotate the threaded member relative to the base. A follower is threaded to the threaded member and pivotally coupled to the platform with a link, to allow the platform to be rotated toward and away from the housing by the motor. A receiver device is received in the housing, and a remote control device may emit control signals to the receiver device, to control the motor to rotate the threaded member, and to rotate and to adjust the platform toward and away from the housing.

11 Claims, 9 Drawing Sheets

ADJUSTABLE SUPPORT DEVICE FOR LEVEL FACILITY

BACKGROUND OF THE INVENTION

1. Field of the Invention

The present invention relates to an adjustable support device for level facility, and more particularly to an adjustable support device for supporting a level facility and for adjusting the level facility up and down to different angular positions.

2. Description of the Prior Art

Typical laser leveling instruments comprise a light emitting device for generating a laser light beam, and for leveling purposes. For example, U.S. Pat. No. 5,594,993 to Tager et al. discloses one of the typical laser leveling instruments comprising a battery powered laser emitting device for generating a visible laser beam, and for leveling purposes. The laser emitting device is tiltable relative to an outer housing by a platform, but may not be precisely tilted to the required angular position.

U.S. Pat. No. 5,842,282 to Ting discloses another typical laser measuring instrument comprising a laser angle adjustment device for rotating a battery powered laser emitting device to different angular positions. However, the laser emitting device may be rotated to the longitudinal axis thereof, but may not be tilted and adjusted up and down to different angular positions.

U.S. Pat. No. 6,202,312 to Rando discloses a further typical laser measuring instrument comprising a laser light generator to produce two or more beams of light at 90° to each other and in a plane parallel to the plane of the floor. However, similarly, the laser light generator also may not be tilted and adjusted up and down to different angular positions.

U.S. Pat. No. 6,493,955 to Moretti discloses a typical instrument for obtaining a reference line and comprising a layer ray emitting device disposed in a supporting body, and pivotally secured to a fixed reference surface with a connecting device or a hinge element which may orientate the supporting body and direct the laser ray and to keep the laser ray in the desired direction. However, similarly, the laser light emitting device also may not be tilted and adjusted up and down to different angular positions.

Furthermore, the laser light emitting devices and/or the layer ray emitting devices of the typical laser measuring instruments are solidly fixed or disposed in a supporting body, and may not be used to support and to adjust the other objects up and down to different angular positions. In addition, the typical laser measuring instruments may not be controlled or operated remotely with a remote control device.

The present invention has arisen to mitigate and/or obviate the afore-described disadvantages of the conventional adjustable support device for level facilities.

SUMMARY OF THE INVENTION

The primary objective of the present invention is to provide an adjustable support device for supporting a level facility and for adjusting the level facility up and down to different angular positions.

The other objective of the present invention is to provide an adjustable support device for level facility for supporting a level facility and for adjusting the level facility to different angular positions with a remote control device.

In accordance with one aspect of the invention, there is provided a adjustable support device for supporting and adjusting a level facility up and down to different angular positions, the support device comprising a base, a housing secured onto the base, a platform including a first end pivotally secured to the housing with a pivot shaft, to allow the platform to be rotated toward and away from the housing, the platform being provided for supporting the level facility, a threaded member rotatably supported on the base and received in the housing, a motor disposed in the housing and coupled to the threaded member, to rotate the threaded member relative to the base and the housing, means for energizing the motor, a follower threaded to the threaded member, a link pivotally coupled between the follower and the platform, to pivotally couple the platform to the follower, and to allow the platform to be rotated toward and away from the housing by the motor via the threaded member and the follower, a receiver device received in the housing, and a remote control device for emitting control signals to the receiver device, and to control the motor to rotate the threaded member, and to rotate and to adjust the platform toward and away from the housing.

The housing includes a casing secured therein to rotatably receive and support the threaded member. The casing includes two end brackets secured thereto to rotatably receive and support the threaded member. The motor is secured to one of the end brackets of the casing.

The housing includes a passage formed therein, the follower includes at least one flap extended therefrom, and extended out through the passage of the housing, and pivotally coupled to the link. The casing includes a bar secured on top thereof and received in the passage of the housing, and having a width smaller than that of the passage of the housing, to form at least one slot between the bar and the housing, and to slidably receive the flap of the follower, and thus to further guide the flap of the follower to slide relative to the housing.

The housing includes a cap disposed therein and located in front of the receiver device, to allow the receiver device to receive the control signals from the remote control device. The motor includes a reduction gearing attached thereto, to reduce a rotational speed of a spindle of the motor.

A seat may further be provided and disposed below the base, and a table rotatably attached onto the seat, and includes at least one latch provided thereon, for engaging with the base, and for securing the base on the table, and to allow the base on the table to be rotated and adjusted relative to the seat. The base includes a plurality of foot stands threaded thereto, to adjustably support the base above ground, and to selectively elevate and space the seat from the ground.

The base includes two switches disposed thereon and located close to two end portions of the threaded member, for being actuated by the follower, and to control and to limit a movement of the follower relative to the threaded member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
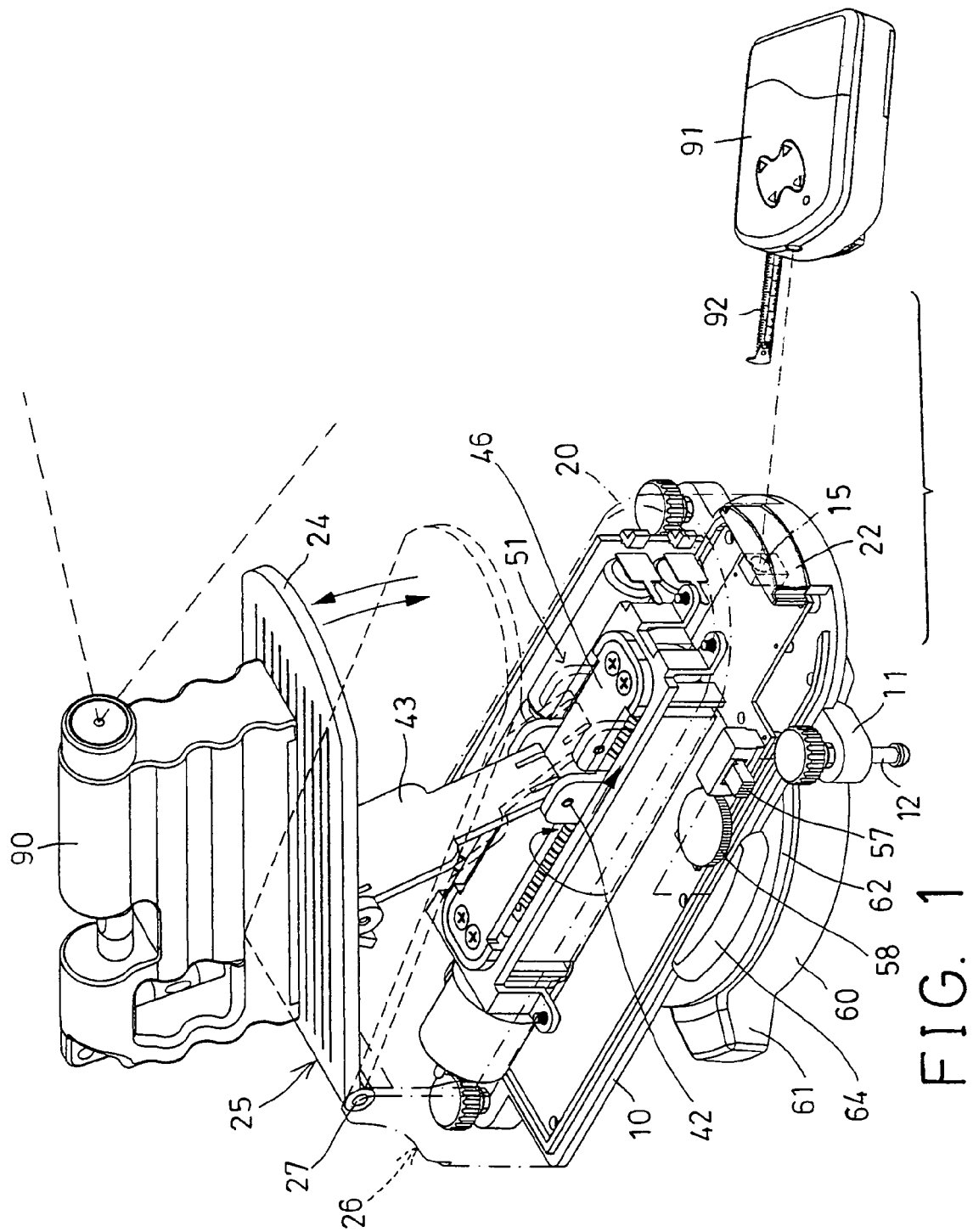
FIG. 1 is a partial exploded view of an adjustable support device for level facility in accordance with the present invention.

Referring to the drawings, and initially to FIGS. 1–5, an adjustable support device 1 in accordance with the present invention is provided for supporting a level facility 90 (FIGS. 1, 9), such as a bubble level device 90 or a laser measuring instrument 90, and for adjusting the level facility 90 up and down to different angular positions, and comprises a remote control device 91 (FIG. 1) for remote controlling the support device 1 and thus the level facility 90 to different angular positions. The remote control device 91 may further include a tape 92 received therein.

The support device 1 includes a base 10 having one or more, such as three ears 11 extended outwardly therefrom, for adjustably threading with fasteners or foot stands 12 which may adjustably support the base 10 above a supporting surface or ground at the required height or elevation (FIGS. 1–2, 4 and 6–8). The base 10 includes a peripheral rib 13 extended upwardly therefrom, to form or define a peripheral shoulder 14 therearound, and includes a receiver device 15 disposed thereon, for receiving control signals from the remote control device 91 (FIG. 1).

A housing 20 is secured onto the base 10 with such as latches or fasteners 16 or the like, and is engaged with the peripheral shoulder 14 and the peripheral rib 13 of the base 10, to anchor and to position the housing 20 to the base 10, and to prevent the housing 20 from moving relative to the base 10. The housing 20 includes a passage 21 formed or provided on top thereof, and a cap 22, such as a transparent or semi-transparent cap 22 disposed in one end 23 thereof, and located in front of or aligned with the receiver device 15, for allowing the receiver device 15 to be received in the housing 20 and to receive the control signals from the remote control device 91.

Figure 9:
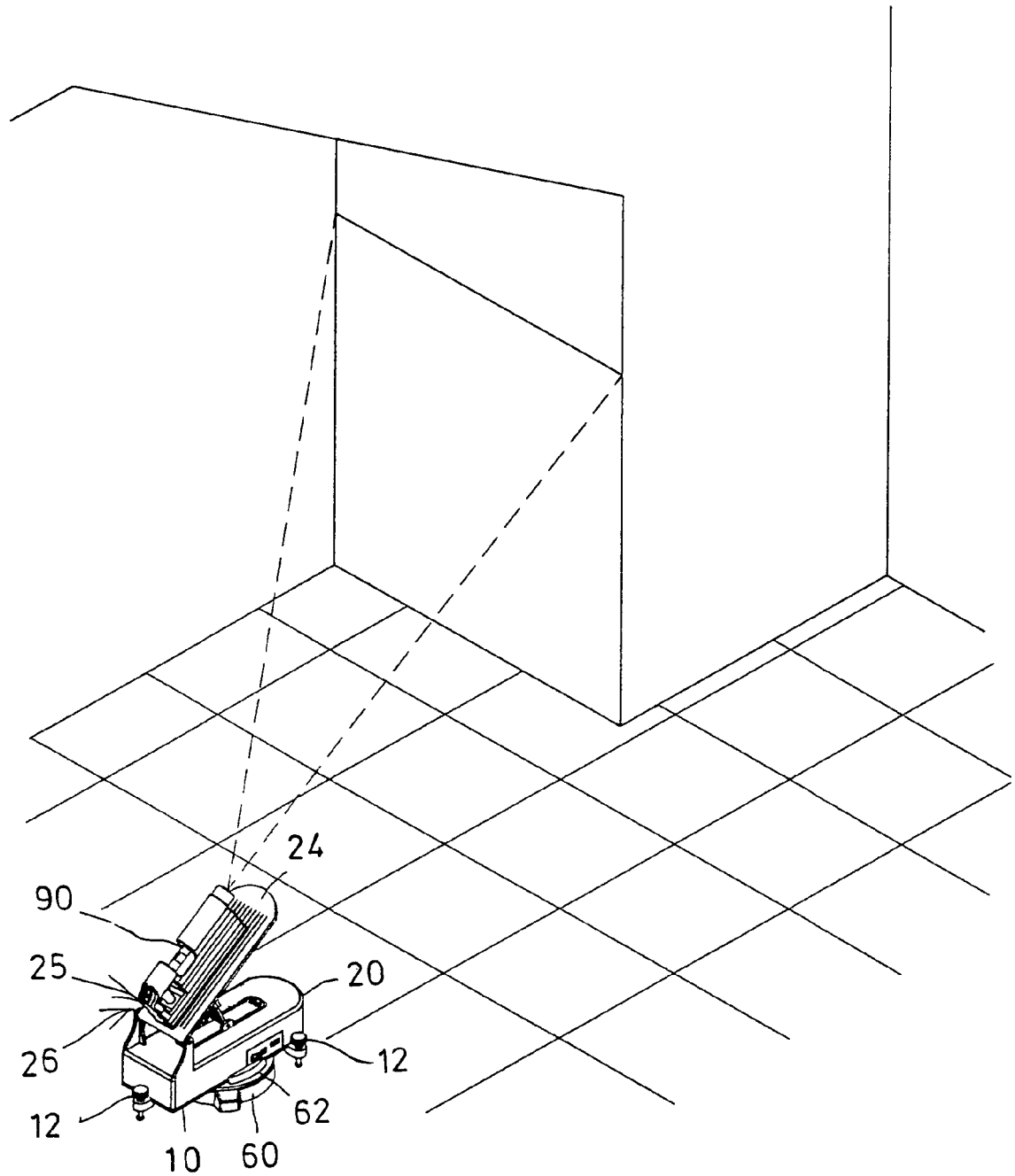
FIG. 9 is another perspective view illustrating the leveling operation of the adjustable support device.

A platform 24 includes one end 25 rotatably or pivotally secured to the other end 26 of the housing 20 with a pivot shaft 27, to allow the platform 24 to be rotated toward and away from the housing 20 with the pivot shaft 27, and includes one or more, such as two brackets 28 extended downwardly therefrom, and offset or spaced away from the one end 25 and the pivot shaft 27. The platform 24 is provided for adjustably supporting the level facility 90 (FIGS. 1, 9).

A casing 30 is disposed or secured on the base 10 with such as fasteners 31, and includes a chamber 32 formed therein to rotatably receive a screw or bolt or threaded member 33 therein. For example, the threaded member 33 may be rotatably received or attached in the casing 30 with two end brackets 34, 35, or may be directly and rotatably supported on the base 10 or in the housing 20. A motor 36 is secured to the casing 30 or to one of the end brackets 34, and includes a spindle 37 extended through the end bracket 34 and secured to the threaded member 33 with such as keys or fasteners 38, to allow the threaded member 33 to be rotated or driven by the motor 36. A reduction gearing 39 may further provided and/or optionally attached to the motor 36, to reduce the rotational speed of the spindle 37 and the threaded member 33.

A follower 40 includes a screw hole 41 formed therein for threading with the threaded member 33, and includes one or more, such as two flaps 42 extended upwardly therefrom, and extended out through the passage 21 of the housing 20, for guiding the follower 40 to slide relative to the housing 20, and for preventing the follower 40 from being rotated relative to the housing 20, and thus for allowing the follower 40 to be moved relative to the housing 20 by the motor 36 via the threaded member 33.

A link 43 includes one end 44 rotatably or pivotally coupled to the flaps 42 of the follower 40, and includes the other end 45 rotatably or pivotally coupled to the brackets 28 of the platform 24, to pivotally couple the platform 24 to the follower 40, and to allow the platform 24 to be rotated or moved toward and away from the housing 20 by the motor 36 via the threaded member 33 and the follower 40 and the link 43 (FIGS. 4, 6, 7) or when the follower 40 is moved relative to the housing 20 by the motor 36, such that the level facility 90 which is supported on the platform 24 (FIGS. 1, 9) may be adjusted relative to the housing 20 to different angular positions.

Figure 2:
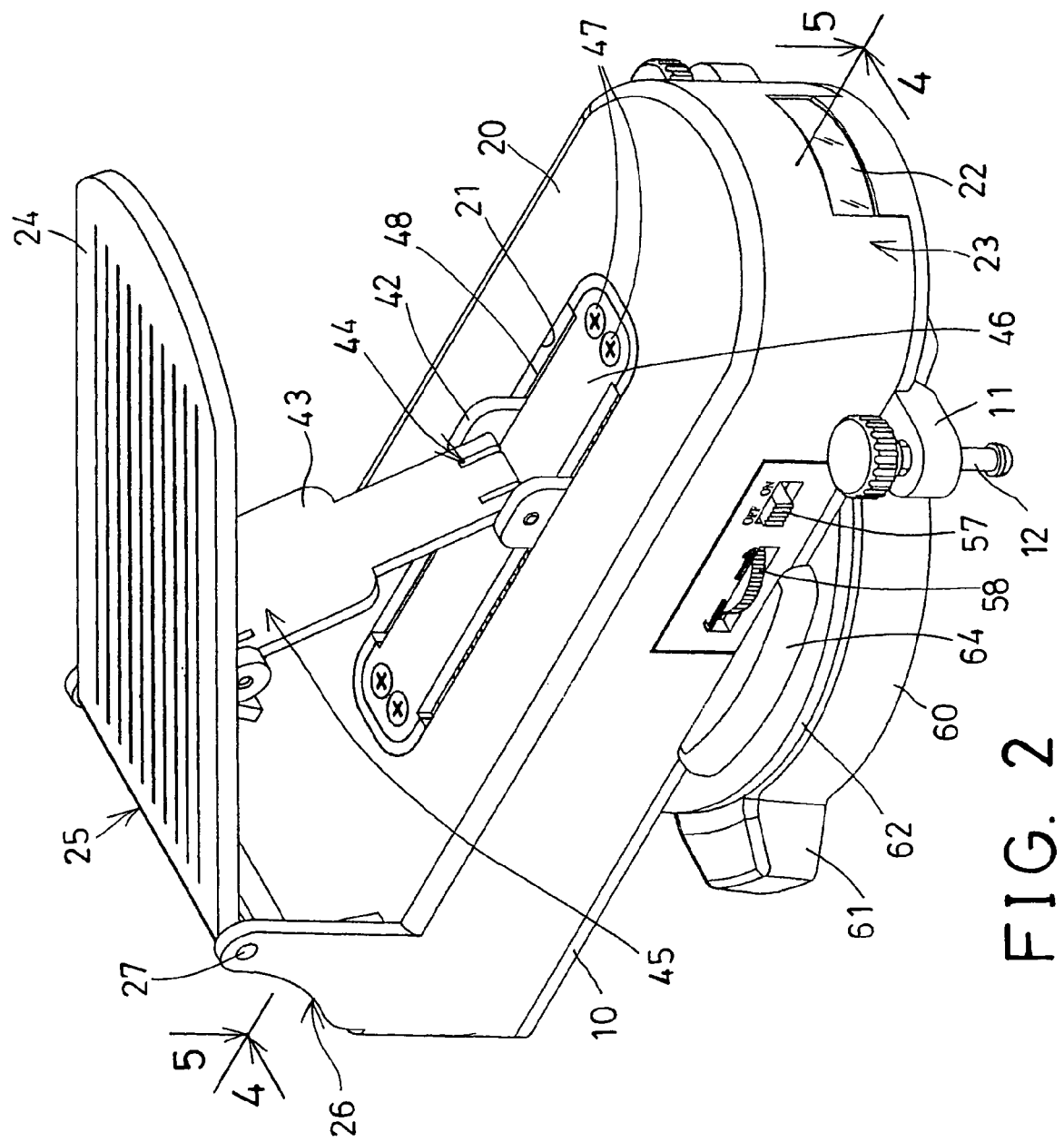
FIG. 2 is a perspective view of the adjustable support device for the level facility.
Figure 3:
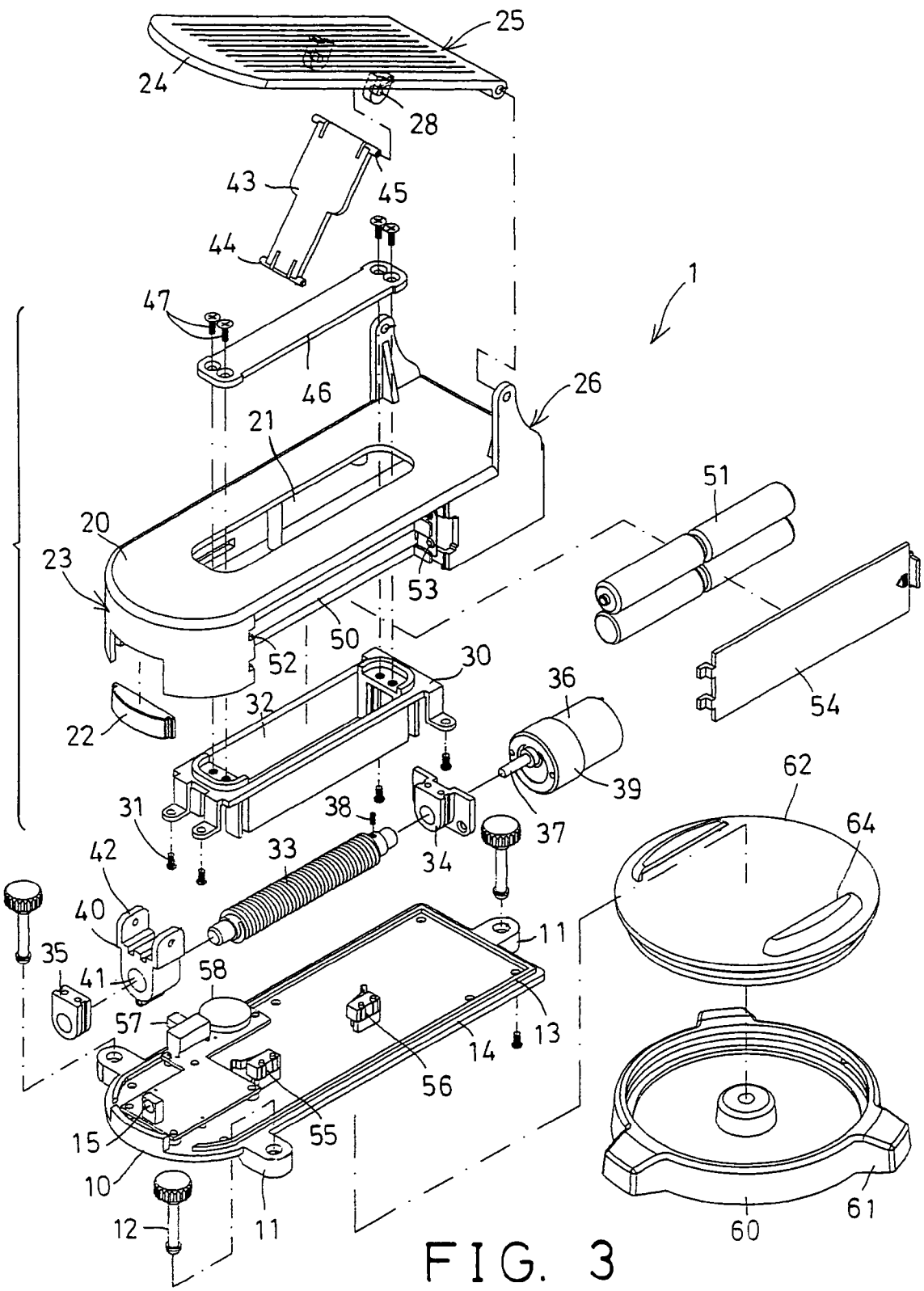
FIG. 3 is another partial exploded view of the adjustable support device.
Figure 4:
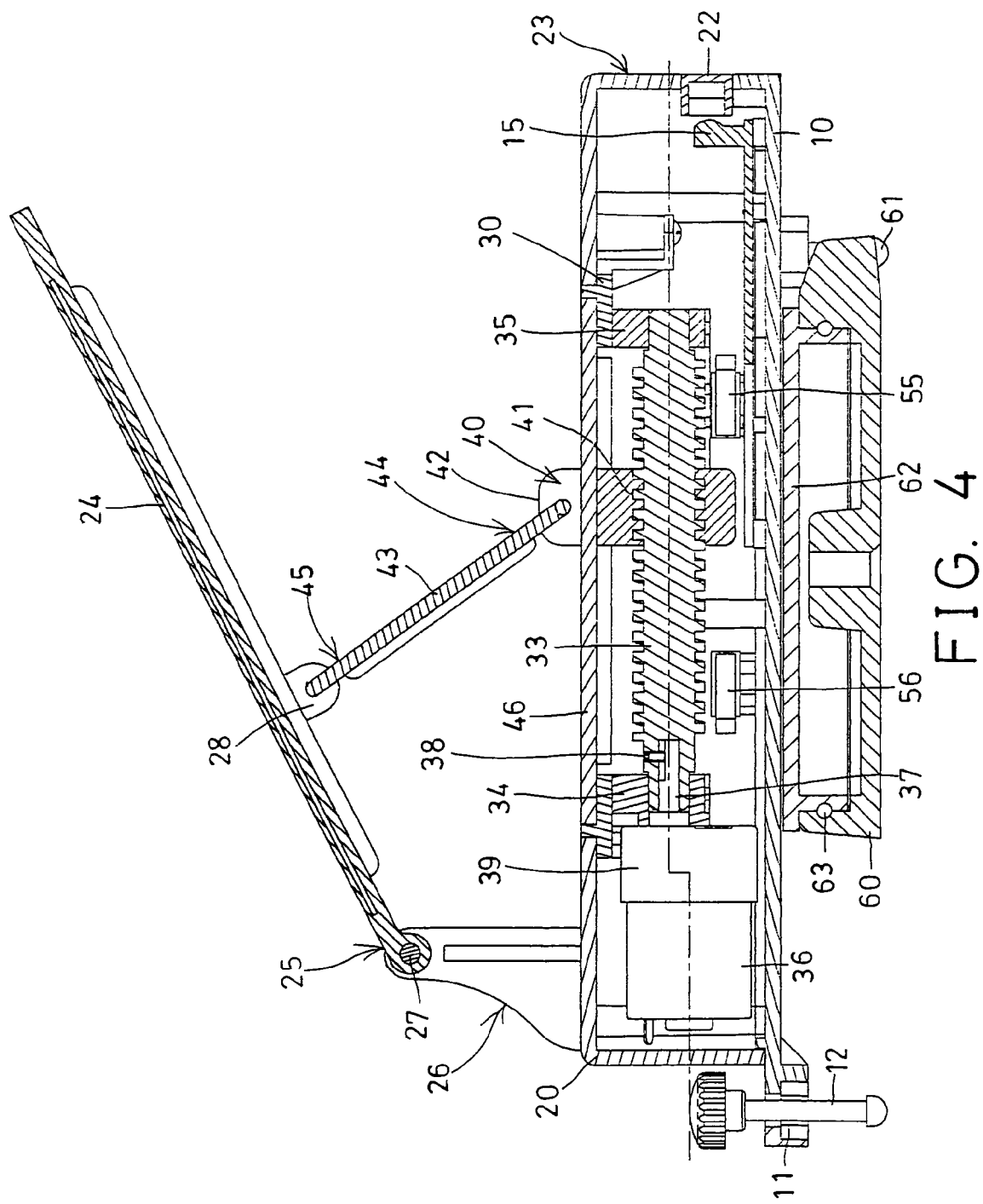
FIGS. 4, 5 are cross sectional views taken along lines 4—4 and 5—5 of FIG. 2 respectively.
Figure 5:
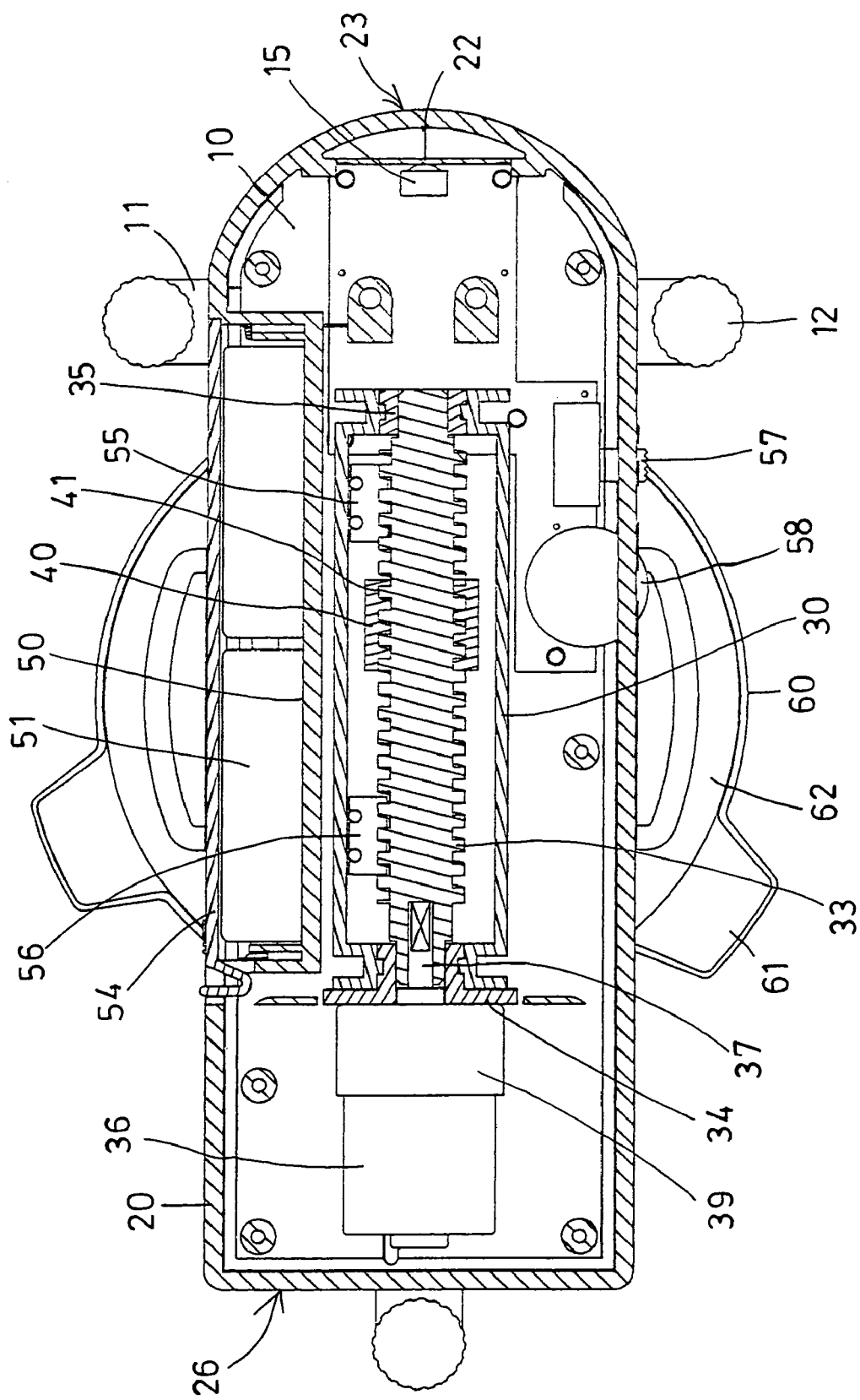
Figure 6:
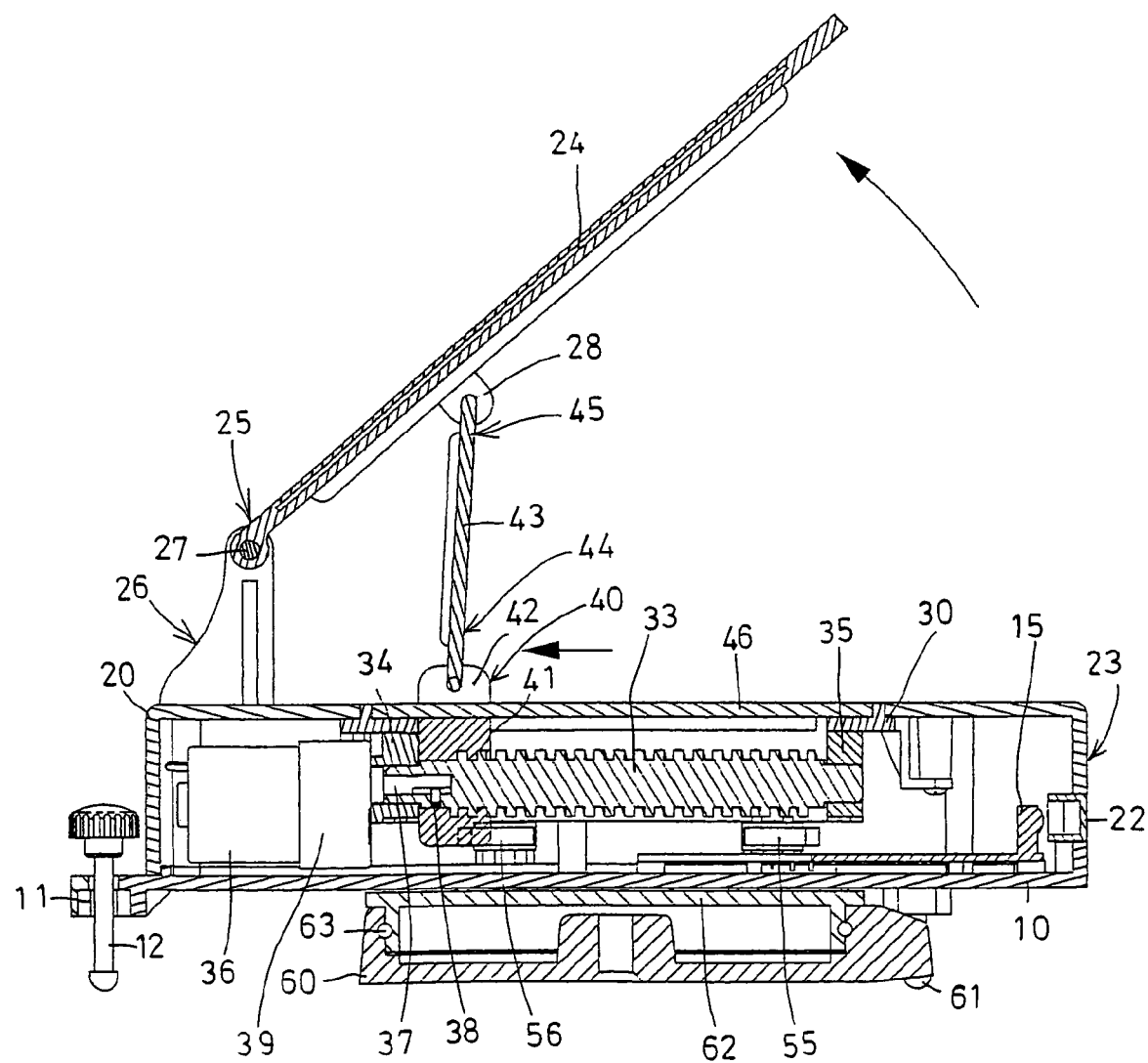
FIGS. 6, 7 are cross sectional views similar to FIG. 4, illustrating the operation of the adjustable support device for the level facility.
Figure 7:
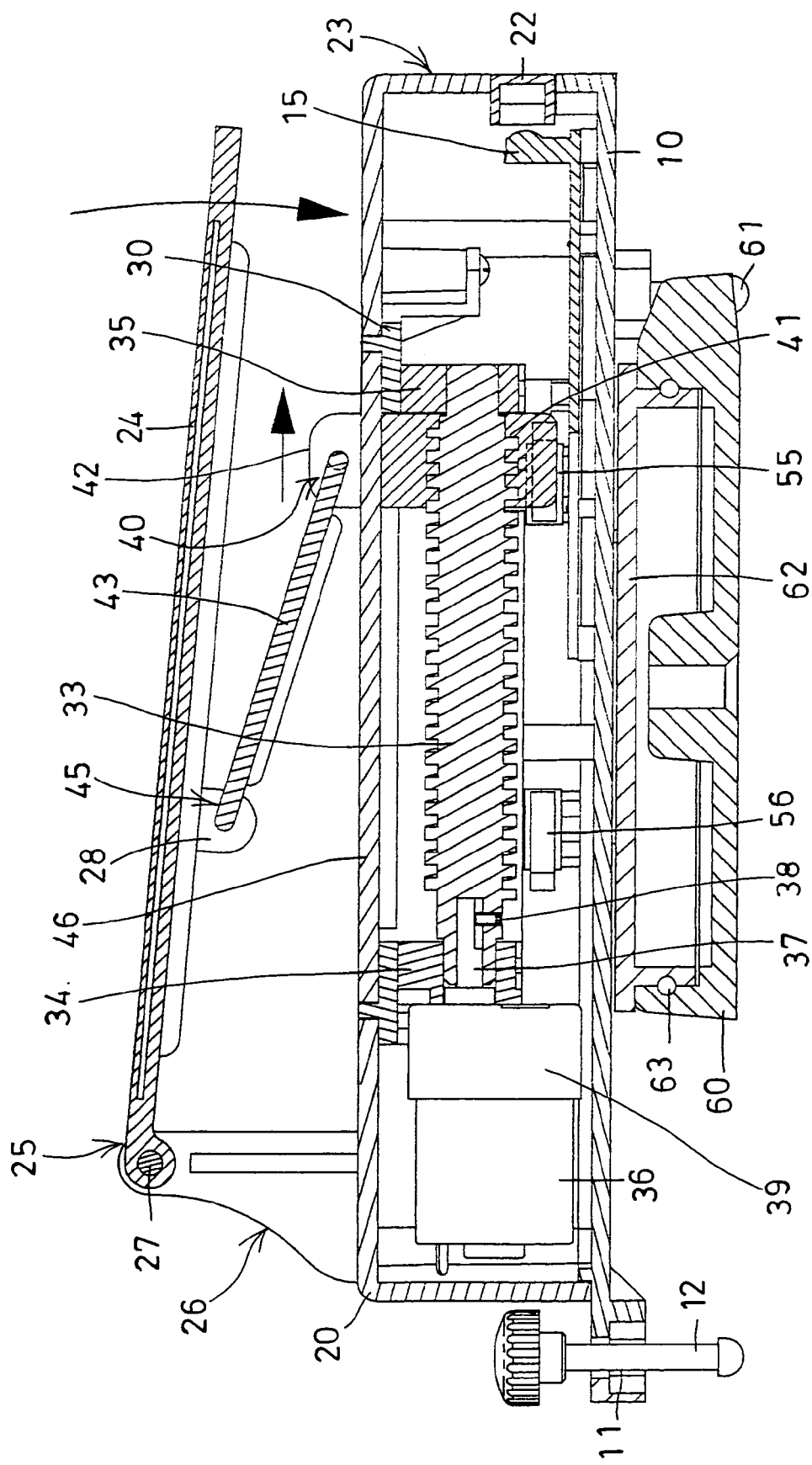
Figure 8:
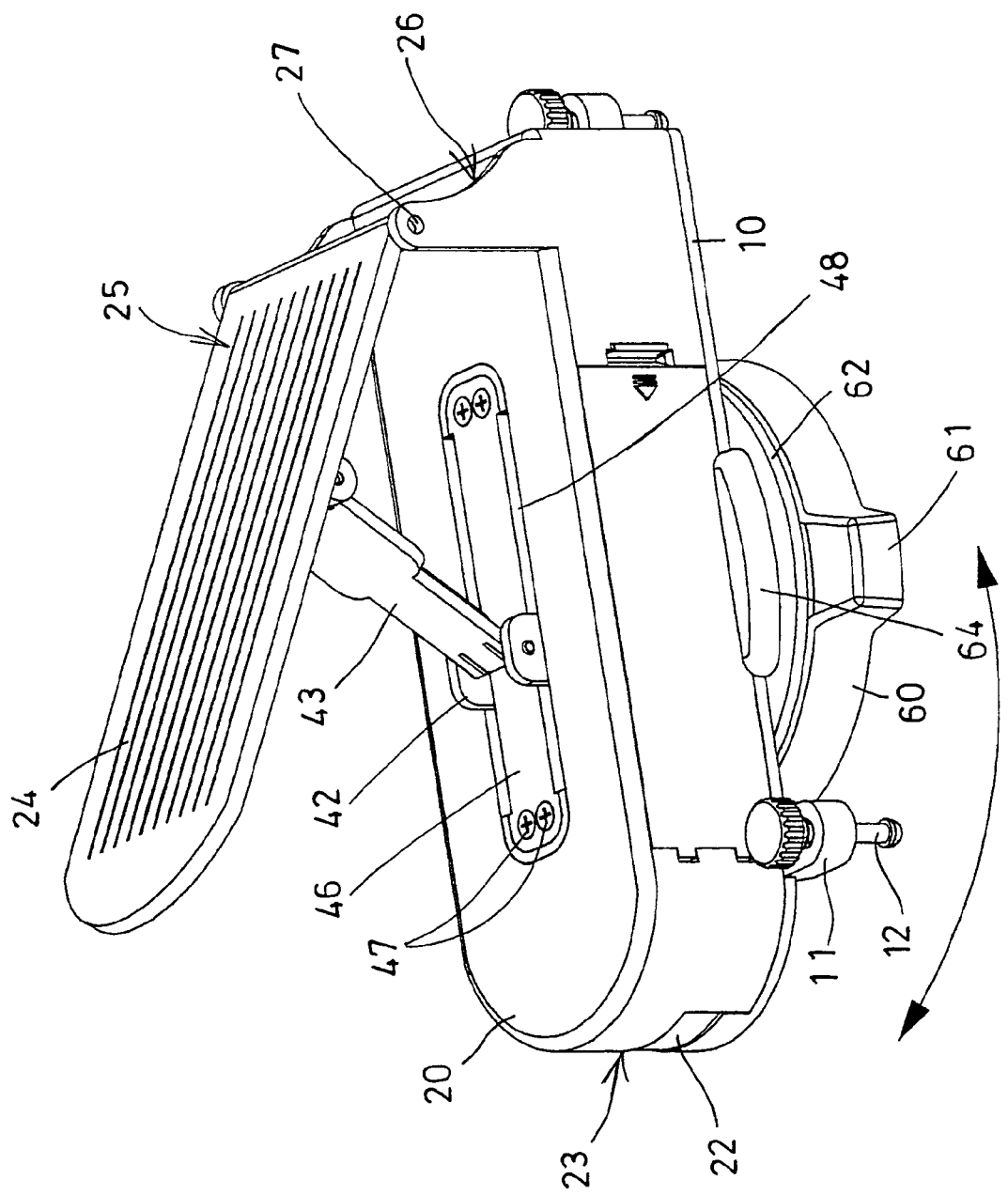
FIG. 8 is a perspective view illustrating the rotational operation of the adjustable support device.

A bar 46 may be secured on top of the casing 30 with such as fasteners 47, and is received in the passage 21 of the housing 20, and includes a width slightly smaller than that of the passage 21 of the housing 20, to form one or more slots 48 between the bar 46 and the housing 20, and to slidably receive the flaps 42 of the follower 40, best shown in FIGS. 2 and 8. The bar 46 may thus be used to enclose the passage 21 of the housing 20, and to shield the threaded member 33.

The housing 20 includes a compartment 50 formed or provided in one side portion thereof, to receive one or more batteries 51 therein, and includes two or more conductor plates 52, 53 disposed in the compartment 50 thereof, and engaged or contacted with the batteries 51, and electrically coupled to the motor 36, to energize the motor 36. The receiver device 15 may also be electrically coupled to the motor 36, to allow the motor 36 to be controlled or operated by the remote control device 91 (FIG. 1). A cover 54 may be secured to the housing 20, to enclose the compartment 50 thereof, and to retain the batteries 51 within the compartment 50 of the housing 20.

One or more, such as two switches or micro-switches 55, 56 may further be provided and disposed on the base 10, and located close to two end portions of the threaded member 33, for being actuated by the follower 40 (FIGS. 6, 7), and for controlling or for stopping the motor 36, in order to control or to limit the movement of the follower 40 relative to the threaded member 33 and relative to the housing 20 and the base 10. A switch 57 may be used to control or to switch on and off the motor 36, and another switch 58 may further be provided to adjust the rotational speed of the motor 36, for example.

A seat 60 may further be provided and disposed below the base 10, and includes one or more, such as three extensions 61 extended radially and outwardly therefrom, for increasing the stability of the seat 60, and for allowing the seat 60 to be stably supported above the supporting surface or the ground. A table 62 is rotatably secured or attached onto the seat 60 with such as pivot pins (not shown) or with ball bearings 63 (FIGS. 4, 6, 7), and includes one or more anchors or latches 64 provided thereon, for engaging with the base 10, and thus for anchoring or securing the base 10 and thus the housing 20 on top of the seat 60 and the table 62.

In operation, as shown in FIGS. 4–7, the level facility 90 which is supported on the platform 24 (FIGS. 1, 9) may be adjusted relative to the housing 20 to different angular positions by rotating the threaded member 33 relative to the follower 40 and by moving the follower 40 relative to the housing 20. The receiver device 15 may be used to receive the control signals from the remote control device 91, to allow the motor 36 to be controlled or operated by the remote control device 91 remotely.

In addition, as shown in FIG. 8, the base 10 and thus the housing 20 may be rotated and adjusted relative to the seat 60 together with the table 62, to allow the housing 20 and the platform 24 and thus the level facility 90 to be rotated relative to the supporting surface or the ground to any suitable or selected angular position.

After the housing 20 and the platform 24 and the level facility 90 have been rotated and adjusted relative to the supporting surface or the ground to the selected angular position, the fasteners or foot stands 12 may be threaded and adjusted relative to the ears 11 of the base 10, to elevate or to space the seat 60 away from the supporting surface or the ground (FIG. 9), and thus to prevent the housing 20 and the platform 24 and the level facility 90 from being further rotated relative to the supporting surface or the ground.

Accordingly, the adjustable support device for level facility in accordance with the present invention may be used for supporting the level facility and for adjusting the level facility up and down to different angular positions.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An adjustable support device comprising:
   a base,
   a housing secured onto said base,
   a platform including a first end pivotally secured to said housing with a pivot shaft, to allow said platform to be rotated up and down relative to said housing to different angular positions,
   a level facility supported on said platform,
   a threaded member rotatably supported on said base and received in said housing,
   a motor disposed in said housing and coupled to said threaded member, to rotate said threaded member relative to said base and said housing,
   a follower threaded to said threaded member,
   a link pivotally coupled between said follower and said platform, to pivotally couple said platform to said follower, and to allow said platform to be rotated toward and away from said housing by said motor via said threaded member and said follower,
   a receiver device received in said housing, and
   a remote control device for emitting control signals to said receiver device, and to control said motor to rotate said threaded member, and to rotate and to adjust said platform and said level facility up and down relative to said housing to different angular positions.

2. The adjustable support device for level facility as claimed in claim 1, wherein said housing includes a casing secured therein to rotatably receive and support said threaded member.

3. The adjustable support device for level facility as claimed in claim 2, wherein said casing includes two end brackets secured thereto to rotatably receive and support said threaded member.

4. The adjustable support device for level facility as claimed in claim 3, wherein said motor is secured to one of said end brackets of said casing.

5. The adjustable support device for level facility as claimed in claim 1, wherein said housing includes a passage formed therein, said follower includes at least one flap extended therefrom, and extended out through said passage of said housing, and pivotally coupled to said link.

6. The adjustable support device for level facility as claimed in claim 5, wherein said casing includes a bar secured on top thereof and received in said passage of said housing, and having a width smaller than that of said passage of said housing, to form at least one slot between said bar and said housing, and to slidably receive said at least one flap of said follower.

7. The adjustable support device for level facility as claimed in claim 1, wherein said housing includes a cap disposed therein and located in front of said receiver device, to allow said receiver device to receive the control signals from said remote control device.

8. The adjustable support device for level facility as claimed in claim 1, wherein said motor includes a reduction gearing attached thereto, to reduce a rotational speed of a spindle of said motor.

9. The adjustable support device for level facility as claimed in claim 1 further comprising a seat disposed below said base, and a table rotatably attached onto said seat, and including at least one latch provided thereon, for engaging with said base, and for securing said base on said table, and to allow said base on said table to be rotated and adjusted relative to said seat.

10. The adjustable support device for level facility as claimed in claim 9, wherein said base includes a plurality of foot stands threaded thereto, to adjustably support said base above ground, and to selectively elevate and space said seat from the ground.

11. The adjustable support device for level facility as claimed in claim 1, wherein said base includes two switches disposed thereon and located close to two end portions of said threaded member, for being actuated by said follower, and to control and to limit a movement of said follower relative to said threaded member.

* * * * *